United States Patent
Lei

(10) Patent No.: US 10,310,876 B2
(45) Date of Patent: Jun. 4, 2019

(54) EXECUTING APPLICATION CODE BASED ON MANNER OF ACCESSING A HARD DISK

(71) Applicant: Huawei Technologies Co., Ltd., Shenzhen (CN)

(72) Inventor: Xiaosong Lei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 15/337,700

(22) Filed: Oct. 28, 2016

(65) Prior Publication Data

US 2017/0046183 A1   Feb. 16, 2017

Related U.S. Application Data

(63) Continuation of application No. PCT/CN2014/076563, filed on Apr. 30, 2014.

(51) Int. Cl.
*G06F 9/455* (2018.01)
*G06F 8/61* (2018.01)
*G06F 3/06* (2006.01)

(52) U.S. Cl.
CPC .......... *G06F 9/45504* (2013.01); *G06F 3/061* (2013.01); *G06F 8/61* (2013.01);
(Continued)

(58) Field of Classification Search
None
See application file for complete search history.

(56) References Cited

U.S. PATENT DOCUMENTS 6,289,411 B1 *   9/2001   Okumura ............... G06F 12/06
                                                               711/5
6,546,554 B1     4/2003   Schmidt et al.
(Continued)

FOREIGN PATENT DOCUMENTS

CN    101437046 A    5/2009
CN    101546601 A    9/2009
(Continued)

OTHER PUBLICATIONS

Machine Translation and Abstract of Chinese Publication No. CN101437046, dated May 20, 2009, 4 pages.
(Continued)

*Primary Examiner* — Abu Zar Ghaffari
(74) *Attorney, Agent, or Firm* — Conley Rose, P.C.

(57) ABSTRACT

A method for a hard disk to execute application code and an apparatus relate to the field of storage technologies such that a hard disk can support a manner of accessing the hard disk based on application code that is from outside of the hard disk, thereby improving performance of the hard disk, and improving a capability of a client to interact with the hard disk. The method includes receiving, by a hard disk, application code and an execution policy of the application code, determining, by the hard disk according to the application code, whether the application code needs to be executed in a virtual machine environment, and executing, by the hard disk in the virtual machine environment, the application code according to the execution policy of the application code when the application code needs to be executed in the virtual machine environment.

22 Claims, 8 Drawing Sheets

(52) U.S. Cl.
CPC .............. *G06F 2009/45579* (2013.01); *G11B 2220/2516* (2013.01)

(56) References Cited

U.S. PATENT DOCUMENTS

| | | | |
|---|---|---|---|
| 6,996,501 | B1 | 2/2006 | Rothberg |
| 7,975,119 | B2* | 7/2011 | Erez .................... G06F 12/0246 |
| | | | 711/166 |
| 8,190,575 | B1 | 5/2012 | Ong et al. |
| 8,869,145 | B1* | 10/2014 | Barve ................... G06F 9/5077 |
| | | | 718/1 |
| 8,874,859 | B2* | 10/2014 | Vilayannur ........... G06F 3/0608 |
| | | | 711/103 |
| 8,997,080 | B2* | 3/2015 | Larkin ...................... G06F 8/65 |
| | | | 717/168 |
| 9,286,087 | B2* | 3/2016 | Sharp .................... G06F 3/0605 |
| 2007/0006218 | A1* | 1/2007 | Vinberg .................... G06F 8/61 |
| | | | 717/174 |
| 2008/0082447 | A1* | 4/2008 | Jogand-Coulomb ... G06F 21/10 |
| | | | 705/53 |
| 2011/0219447 | A1* | 9/2011 | Horovitz ............. G06F 9/45533 |
| | | | 726/22 |
| 2011/0252186 | A1* | 10/2011 | Dinker .................. G06F 3/0613 |
| | | | 711/103 |
| 2012/0179846 | A1* | 7/2012 | Haustein ................. G06F 3/061 |
| | | | 710/38 |
| 2013/0111221 | A1* | 5/2013 | Fujii ..................... G06F 3/0604 |
| | | | 713/193 |
| 2013/0268763 | A1* | 10/2013 | Sweet ................. H04L 63/0428 |
| | | | 713/176 |
| 2013/0297903 | A1* | 11/2013 | Kaneko ................ G06F 3/0605 |
| | | | 711/165 |

FOREIGN PATENT DOCUMENTS

| | | |
|---|---|---|
| CN | 102656562 A | 9/2012 |
| CN | 103051687 A | 4/2013 |
| CN | 103703441 A | 4/2014 |
| JP | 2003521036 A | 7/2003 |
| JP | 2012203679 A | 10/2012 |

OTHER PUBLICATIONS

Machine Translation and Abstract of Chinese Publication No. CN101546601, dated Sep. 30, 2009, 7 pages.
Machine Translation and Abstract of Chinese Publication No. CN103051687, dated Apr. 17, 2013, 7 pages.
Foreign Communication From a Counterpart Application, PCT Application No. PCT/CN2014/076563, English Translation of International Search Report dated Jan. 30, 2015, 2 pages.
Foreign Communication From a Counterpart Application, PCT Application No. PCT/CN2014/076563, English Translation of Written Opinion dated Jan. 30, 2015, 10 pages.
Machine Translation and Abstract of Japanese Publication No. JP2012203679, Oct. 22, 2012, 9 pages.
Shimizu, M., "Why you should now buy NAS", DOS/V Power Report, Impress Japan Co., Ltd., Impress Japan Co., Ltd. Feb. 28, 2011, vol. 21, No. 4, pp. 99-113.
English Translation of Shimizu, M., "Why you should now buy NAS", DOS/V Power Report, Impress Japan Co., Ltd., Impress Japan Co., Ltd. Feb. 28, 2011, vol. 21, No. 4, 29 pages.
Robert Love, "Linux system programming", O'Reilly Japan Co., Ltd., Apr. 14, 2008, 1st edition, 3 pages.
English Translation of Robert Love, "Linux system programming", O Reilly Japan Co., Ltd., Apr. 14, 2008, 1st edition, 4 pages.
"Cosminexus Application Server V8 Reference Definition (Server Definition) Grammar Book", Hitachi, Ltd., Nov. 2008, 1st edition, 3 pages.
English Translation of "Cosminexus Application Server V8 Reference Definition (Server Definition) Grammar Book", Hitachi, Ltd., Nov. 2008, 1st edition, 3 pages.
Foreign Communication From a Counterpart Application, Japanese Application No. 2016-565326, Japanese Office Action dated Jan. 23, 2018, 4 pages.
Foreign Communication From a Counterpart Application, Japanese Application No. 2016-565326, English Translation of Japanese Office Action dated Jan. 23, 2018, 4 pages.
Foreign Communication From a Counterpart Application, Chinese Application No. 201480000524.9, Chinese Office Action dated May 10, 2017, 10 pages.
Foreign Communication From a Counterpart Application, Chinese Application No. 201480000524.9, English Translation of Chinese Office Action dated May 10, 2017, translation dated Jul. 10, 2018, 4 pages.

* cited by examiner

EXECUTING APPLICATION CODE BASED ON MANNER OF ACCESSING A HARD DISK

CROSS-REFERENCE TO RELATED APPLICATIONS

This application is a continuation of International Application No. PCT/CN2014/076563, filed on Apr. 30, 2014, the disclosure of which is hereby incorporated by reference in its entirety.

TECHNICAL FIELD

The present disclosure relates to the field of storage technologies, and in particular, to a method for a hard disk to execute application code and an apparatus.

BACKGROUND

In recent years, with the rise of cloud storage, a hard disk having an Ethernet interface, that is, an Ethernet interface hard disk, is increasingly widely used.

An existing Ethernet interface hard disk provides an open Key-Value semantic interface such that a client may access the Ethernet interface hard disk using the Key-Value interface of the Ethernet interface hard disk. Further, the client provides a Key to the Ethernet interface hard disk, to be used as a logical address, and after the Ethernet interface hard disk acquires the Key, the Ethernet interface hard disk may find, in storage space of the Ethernet interface hard disk by means of addressing, a physical address corresponding to the Key. The Ethernet interface hard disk may read a corresponding Value from the physical address, and return the Value to the client if the client performs read access on the Ethernet interface hard disk, or the Ethernet interface hard disk may write a Value, which is provided by the client, to the physical address if the client performs write access on the Ethernet interface hard disk.

However, the Ethernet interface hard disk in the prior art supports only an access manner that is based on the Key-Value semantic interface. Therefore, the client can access the Ethernet interface hard disk only using the Key-Value interface, which limits a capability of the client to interact with the Ethernet interface hard disk.

SUMMARY

The present disclosure provides a method for a hard disk to execute application code and an apparatus such that a hard disk can support a manner of accessing the hard disk based on application code that is from outside of the hard disk, thereby improving performance of the hard disk, and improving a capability of a client to interact with the hard disk.

To achieve the foregoing objective, the following technical solutions are used in embodiments of the present disclosure.

According to a first aspect, the present disclosure provides a method for a hard disk to execute application code, including receiving, by a hard disk, application code and an execution policy of the application code, determining, by the hard disk according to the application code, whether the application code needs to be executed in a virtual machine environment, and executing, by the hard disk in the virtual machine environment, the application code according to the execution policy of the application code if the application code needs to be executed in the virtual machine environment.

In a first possible implementation manner of the first aspect, the method further includes receiving, by the hard disk, virtual machine data information, where the virtual machine data information is used to create the virtual machine environment, and creating, by the hard disk, the virtual machine environment according to the virtual machine data information.

With reference to the first aspect or the first possible implementation manner of the first aspect, in a second possible implementation manner, the application code carries a virtual machine identifier, and the method further includes determining, by the hard disk according to the virtual machine identifier carried in the application code, the virtual machine environment in which the application code is executed.

With reference to the first aspect or either implementation manner of the first possible implementation manner and the second possible implementation manner of the first aspect, in a third possible implementation manner, executing, by the hard disk in the virtual machine environment, the application code according to the execution policy of the application code includes creating, by the hard disk, an application code process for the application code in the virtual machine environment, loading, by the hard disk, the application code into memory, which corresponds to the application code process, of the hard disk, and executing, by the hard disk in the virtual machine environment, the application code process according to the execution policy of the application code.

With reference to the first possible implementation manner of the first aspect, in a fourth possible implementation manner, the method further includes receiving, by the hard disk, an execution indication of the virtual machine data information, where the execution indication of the virtual machine data information is used to instruct the hard disk whether to persist the virtual machine data information, and performing, by the hard disk, an operation on the virtual machine data information according to the execution indication of the virtual machine data information, where the operation corresponds to the execution indication of the virtual machine data information.

With reference to the first aspect or any implementation manner of the first possible implementation manner to the fourth possible implementation manner of the first aspect, in a fifth possible implementation manner, the execution policy of the application code includes at least one of a trigger condition for executing the application code, an execution condition of the application code, or an operation after the execution of the application code is completed.

According to a second aspect, the present disclosure provides a hard disk, including a receiving unit configured to receive application code and an execution policy of the application code, a determining unit configured to determine, according to the application code received by the receiving unit, whether the application code needs to be executed in a virtual machine environment, and an executing unit configured to execute, in the virtual machine environment according to the execution policy of the application code received by the receiving unit, the application code received by the receiving unit if the determining unit determines that the application code needs to be executed in the virtual machine environment.

In a first possible implementation manner of the second aspect, the hard disk further includes a creating unit, where the receiving unit is further configured to receive virtual machine data information, where the virtual machine data information is used to create the virtual machine environment, and the creating unit is configured to create the virtual machine environment according to the virtual machine data information received by the receiving unit.

With reference to the second aspect or the first possible implementation manner of the second aspect, in a second possible implementation manner, the application code carries a virtual machine identifier, and the determining unit is further configured to determine, according to the virtual machine identifier carried in the application code, the virtual machine environment in which the application code is executed.

With reference to the first possible implementation manner of the second aspect, in a third possible implementation manner, the hard disk further includes a loading unit, where the creating unit is further configured to create an application code process in the virtual machine environment for the application code received by the receiving unit. The loading unit is configured to load the application code received by the receiving unit into memory, which corresponds to the application code process created by the creating unit, of the hard disk, and the executing unit is further configured to execute, in the virtual machine environment created by the creating unit, the application code process, which is created by the creating unit, according to the execution policy of the application code received by the receiving unit.

With reference to the first possible implementation manner of the second aspect, in a fourth possible implementation manner, the receiving unit is further configured to receive an execution indication of the virtual machine data information, where the execution indication of the virtual machine data information is used to instruct whether to persist the virtual machine data information, and the executing unit is further configured to perform, according to the execution indication received by the receiving unit of the virtual machine data information, an operation on the virtual machine data information received by the receiving unit, where the operation corresponds to the execution indication of the virtual machine data information.

With reference to the second aspect or any implementation manner of the first possible implementation manner to the fourth possible implementation manner of the second aspect, in a fifth possible implementation manner, the execution policy of the application code received by the receiving unit includes at least one of a trigger condition for executing the application code, an execution condition of the application code, or an operation after the execution of the application code is completed.

According to a third aspect, the present disclosure further provides a hard disk, including a processor configured to receive application code and an execution policy of the application code, determine, according to the application code, whether the application code needs to be executed in a virtual machine environment, and execute, in the virtual machine environment, the application code according to the execution policy of the application code if the application code needs to be executed in the virtual machine environment, and a storage configured to store the application code and the execution policy of the application code.

In a first possible implementation manner of the third aspect, the processor is further configured to receive virtual machine data information, and create the virtual machine environment according to the virtual machine data information, where the virtual machine data information is used to create the virtual machine environment, and the storage is further configured to store the virtual machine data information.

With reference to the third aspect or the first possible implementation manner of the third aspect, in a second possible implementation manner, the application code carries a virtual machine identifier, and the processor is further configured to determine, according to the virtual machine identifier carried in the application code, the virtual machine environment in which the application code is executed.

With reference to the third aspect or either implementation manner of the first possible implementation manner and the second possible implementation manner of the third aspect, in a third possible implementation manner, the processor is further configured to create an application code process for the application code in the virtual machine environment, load the application code into memory, which corresponds to the application code process, of the hard disk, and execute the application code process in the virtual machine environment.

With reference to the first possible implementation manner of the third aspect, in a fourth possible implementation manner, the processor is further configured to receive an execution indication of the virtual machine data information, and perform an operation on the virtual machine data information according to the execution indication of the virtual machine data information, where the operation corresponds to the execution indication of the virtual machine data information, and the execution indication of the virtual machine data information is used to instruct whether to persist the virtual machine data information, and the storage is further configured to store the execution indication of the virtual machine data information.

With reference to the third aspect or any implementation manner of the first possible implementation manner to the fourth possible implementation manner of the third aspect, in a fifth possible implementation manner, the execution policy of the application code received by the processor includes at least one of a trigger condition for executing the application code, an execution condition of the application code, or an operation after the execution of the application code is completed.

The present disclosure provides a method for a hard disk to execute application code and an apparatus. A hard disk receives application code and an execution policy of application code, and determines whether the application code needs to be executed in a virtual machine environment, and the hard disk executes, in the virtual machine environment, the application code according to the execution policy of the application code if the hard disk determines that the application code needs to be executed in the virtual machine environment. By means of the solution, a hard disk may receive application code that is from outside of the hard disk (for example, customized application code) and an execution policy of the application code, and execute, in a virtual machine environment, the application code according to the execution policy, that is, the hard disk can support a manner of accessing the hard disk based on application code that is from outside of the hard disk, thereby improving performance of the hard disk, and improving a capability of a client to interact with the hard disk.

According to a fourth aspect, the present disclosure provides a method for a hard disk to execute application code, including receiving, by a hard disk, application code and an execution policy of the application code, creating, by the hard disk, an application code process for the application code, loading, by the hard disk, the application code into memory, which corresponds to the application code process, of the hard disk, and executing, by the hard disk in the memory of the hard disk, the application code process according to the execution policy of the application code.

In a first possible implementation manner of the fourth aspect, the execution policy of the application code includes at least one of a trigger condition for executing the application code, an execution condition of the application code, or an operation after the execution of the application code is completed, and an identifier of the application code, a start position of the application code, and a length of the application code.

With reference to the fourth aspect or the first possible implementation manner of the fourth aspect, in a second possible implementation manner, the application code is application code in a binary format.

According to a fifth aspect, the present disclosure provides a hard disk, including a receiving unit configured to receive application code and an execution policy of the application code, a creating unit configured to create an application code process for the application code received by the receiving unit, a loading unit configured to load the application code received by the receiving unit into memory, which corresponds to the application code process created by the creating unit, of the hard disk, and an executing unit configured to execute the application code process, which is created by the creating unit, in the memory of the hard disk according to the execution policy of the application code received by the receiving unit.

In a first possible implementation manner of the fifth aspect, the execution policy of the application code received by the receiving unit includes at least one of a trigger condition for executing the application code, an execution condition of the application code, or an operation after the execution of the application code is completed, and an identifier of the application code, a start position of the application code, and a length of the application code.

With reference to the fifth aspect or the first possible implementation manner of the fifth aspect, in a second possible implementation manner, the application code received by the receiving unit is application code in a binary format.

According to a sixth aspect, the present disclosure provides a hard disk, including a processor configured to receive application code and an execution policy of the application code, create an application code process for the application code, load the application code into memory, which corresponds to the application code process, of the hard disk, and execute, in the memory of the hard disk, the application code process according to the execution policy of the application code, and a storage configured to store the application code and the execution policy of the application code.

In a first possible implementation manner of the sixth aspect, the execution policy of the application code received by the processor includes at least one of a trigger condition for executing the application code, an execution condition of the application code, or an operation after the execution of the application code is completed, and an identifier of the application code, a start position of the application code, and a length of the application code.

With reference to the sixth aspect or the first possible implementation manner of the sixth aspect, in a second possible implementation manner, the application code received by the processor is application code in a binary format.

The present disclosure provides a method for a hard disk to execute application code and an apparatus. A hard disk receives application code and an execution policy of the application code, the hard disk creates an application code process for the application code, and the hard disk loads the application code into memory, which corresponds to the application code process, of the hard disk such that the hard disk executes, in the memory of the hard disk, the application code process according to the execution policy of the application code. By means of the solution, a hard disk may receive application code that is from outside of the hard disk (for example, customized application code) and an execution policy of the application code, and execute, in a process manner, the application code according to the execution policy, that is, the hard disk can support a manner of accessing the hard disk based on application code that is from outside of the hard disk, thereby improving performance of the hard disk, and improving a capability of a client to interact with the hard disk.

DESCRIPTION OF EMBODIMENTS

In the prior art, an Ethernet interface hard disk supports only a Key-Value semantic interface, and does not support another interface. Therefore, a user can perform the accessing only using the Key-Value semantic interface when accessing the hard disk using a client and a server. However, the Key-Value semantic interface supports only some operations of storing data, and cannot support an operation customized by the user. In a method for a hard disk to execute application code provided in embodiments of the present disclosure, a data application programming interface (API) and a management API may be defined for a hard disk such that the hard disk may receive, from a data plane interface of a server by invoking the data API of the hard disk, application code of an operation specified by a user and an execution policy of the application code, or the hard disk may receive (receive from outside of the hard disk), from a management plane interface of a server by invoking the management API of the hard disk, application code of an operation specified by a user and an execution policy of the application code. Therefore, the hard disk can execute, according to the application code received from outside of the hard disk (for example, customized by the user according to a need) and the execution policy of the application code, an operation corresponding to the application code (for example, an operation customized by the user), which implements access to the hard disk based on the application code received from outside of the hard disk, improving performance of the hard disk, and improving a capability of a client to interact with the hard disk.

With reference to the accompanying drawings, the following describes in detail a method for a hard disk to execute application code and an apparatus that are provided in the embodiments of the present disclosure. Further, in the method for a hard disk to execute application code provided in the embodiments of the present disclosure, corresponding to a method for executing application code provided in an embodiment of the present disclosure, the application code may be application code that needs to be executed in a virtual machine environment, that is, the application code is application code written using a programming language, corresponding to another method for executing application code provided in an embodiment of the present disclosure, the application code may be application code in a binary format.

Embodiment 1

Figure 1:
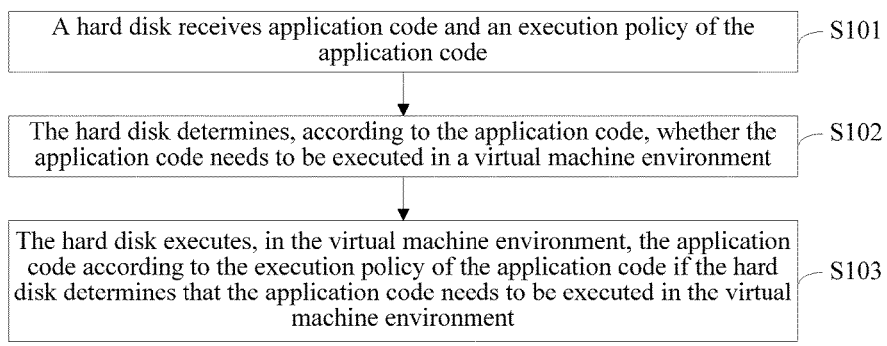
FIG. 1 is a flowchart diagram of a method for a hard disk to execute application code according to an embodiment of the present disclosure.

This embodiment of the present disclosure provides a method for a hard disk to execute application code. As shown in FIG. 1, the method may include the following steps.

Step S101: A hard disk receives application code and an execution policy of the application code.

The hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an Advanced Reduced Instruction Set Computing Machines (ARM) system. The hard disk that is based on the ARM system integrates the ARM system into a conventional hard disk, to improve performance of the conventional hard disk.

If a user needs to use the hard disk to perform some specified operations (some functions that the user needs to extend in the hard disk), for example, performing virus scanning for the hard disk, performing integrity check on hard disk data, compressing the hard disk data, performing garbage collection on the hard disk, migrating and copying the hard disk data to another hard disk, encrypting the hard disk data based on a key provided by the user, and executing a policy customized by the user, the user may write application code of these specified operations, and set execution policies of the application code of these specified operations such that the user can send the application code and the execution policies of the application code to the hard disk using a client and a deployed server, that is, the hard disk receives application code and an execution policy of the application code that are sent by the server, where the execution policy of the application code may be preset according to an actual need.

It should be noted that, in the method for a hard disk to execute application code provided in this embodiment of the present disclosure, the server may include a data plane interface and a management plane interface. In the method for a hard disk to execute application code provided in this embodiment, the application code and the execution policy of the application code may be transmitted to the hard disk using the data plane interface of the server.

Further, the application code provided in this embodiment is application code that needs to be executed in a virtual machine environment, that is, the application code is application code written using a programming language. Therefore, the transmission may be performed using the data plane interface of the server when the server transmits the application code to the hard disk.

Further, the application code and the execution policy of the application code may be transmitted to the hard disk using the data plane interface of the server and invoking a data API of the hard disk.

Particularly, the data API provided in this embodiment of the present disclosure may be an interface on a hard disk data plane, where the data API is an interface that is located on a plane that is the same as a plane on which a Key-Value interface of the hard disk is located.

It should be noted that, in the method for a hard disk to execute application code provided in this embodiment of the present disclosure, the application code that may be executed by the hard disk includes but is not limited to the application code of the operations specified by the user, that is, the application code provided in this embodiment of the present disclosure may be written by the user according to an actual need, and is not limited in the present disclosure.

Further, the execution policy of the application code may include at least one of a trigger condition for executing the application code, an execution condition of the application code, or an operation after the execution of the application code is completed. For example, the trigger condition for executing the application code may include that the hard disk executes the application code if having not received an external service request for 24 hours. The execution condition of the application code may include exiting after the execution of the application code is completed, or executing the application code again when a fault occurs during the execution of the application code, and the operation after the execution of the application code is completed may include recording an execution log into a specified log area of the hard disk after the execution of the application code is completed, or sending an execution log to an external network management system server after the execution of the application code is completed.

Particularly, the execution policy of the application code provided in this embodiment of the present disclosure includes but is not limited to those described above, that is, the execution policy of the application code provided in this embodiment of the present disclosure may be set according to an actual execution need, and is not limited in the present disclosure.

Step S102: The hard disk determines, according to the application code, whether the application code needs to be executed in a virtual machine environment.

After the hard disk receives the application code, the hard disk may determine, according to the application code, whether the application code needs to be executed in the virtual machine environment.

Generally, virtual machines in a computer and running environments formed by the virtual machines are mostly common. If a general "virtual machine" refers to software and hardware of the virtual machine, a "virtual machine environment" is the virtual machine that is running.

For example, the virtual machine environment is a JAVA virtual machine (JVM) environment if the virtual machine is a JVM.

Step S103: The hard disk executes, in the virtual machine environment, the application code according to the execution policy of the application code if the hard disk determines that the application code needs to be executed in the virtual machine environment.

After the hard disk receives the application code, the hard disk may determine, according to the application code, whether the application code needs to be executed in a virtual machine environment, and the hard disk may execute, in the virtual machine environment, the application code according to the execution policy of the application code if the hard disk determines that the application code needs to be executed in the virtual machine environment.

Further, it indicates that the application code is application code that can be executed based on only a virtual machine, that is, it indicates that the application code is application code designed using a programming language if the application code needs to be executed in a virtual machine environment. Therefore, the hard disk may interpret and execute the application code based on the virtual machine, that is, the hard disk may interpret and execute the application code in the virtual machine environment, that is, in the virtual machine that is running when executing the application code.

Exemplarily, if the application code is JAVA (a programming language) bytecode and the corresponding virtual machine is a JVM, when executing the JAVA bytecode, the hard disk needs to interpret and execute the JAVA bytecode in the JVM environment, that is, interpret and execute the application code in the JVM that is running. The JAVA bytecode is code obtained after original JAVA code is compiled.

For example, correspondences between a virtual machine, a virtual machine environment, and application code that needs to be executed in the virtual machine environment that are provided in this embodiment of the present disclosure may include any one of the following.

(1) The virtual machine is a JVM, the virtual machine environment is a JVM environment, and the application code that needs to be executed in the virtual machine environment is JAVA bytecode that needs to be executed in the JVM environment.

(2) The virtual machine is a script engine, the virtual machine environment is a script engine environment, and the application code that needs to be executed in the virtual machine environment is script code that needs to be executed in the script engine environment.

(3) The virtual machine is a structured query language (SQL) engine, the virtual machine environment is an SQL engine environment, and the application code that needs to be executed in the virtual machine environment is an SQL statement that needs to be executed in the SQL engine environment.

(4) The virtual machine is an engine customized by a user, the virtual machine environment is an engine environment customized by the user, and the application code that needs to be executed in the virtual machine environment is code that needs to be executed in the engine environment customized by the user.

It should be noted that, the four correspondences between the virtual machine, the virtual machine environment, and the application code that needs to be executed in the virtual machine environment are only exemplary for description, that is, the correspondences between the virtual machine, the virtual machine environment, and the application code that needs to be executed in the virtual machine environment that are provided in this embodiment of the present disclosure include but are not limited to the four. A correspondence, which is designed in another manner that meets an actual design requirement, between a virtual machine, a virtual machine environment, and application code that needs to be executed in the virtual machine environment also falls within the protection scope of the present disclosure.

This embodiment of the present disclosure provides a method for a hard disk to execute application code. A hard disk receives application code and an execution policy of application code, and determines whether the application code needs to be executed in a virtual machine environment, and the hard disk executes, in the virtual machine environment, the application code according to the execution policy of the application code if the hard disk determines that the application code needs to be executed in the virtual machine environment. By means of the solution, a hard disk may receive application code that is from outside of the hard disk (for example, customized application code) and an execution policy of the application code, and execute, in a virtual machine environment, the application code according to the execution policy, that is, the hard disk can support a manner of accessing the hard disk based on application code that is from outside of the hard disk, thereby improving performance of the hard disk, and improving a capability of a client to interact with the hard disk.

Figure 2:
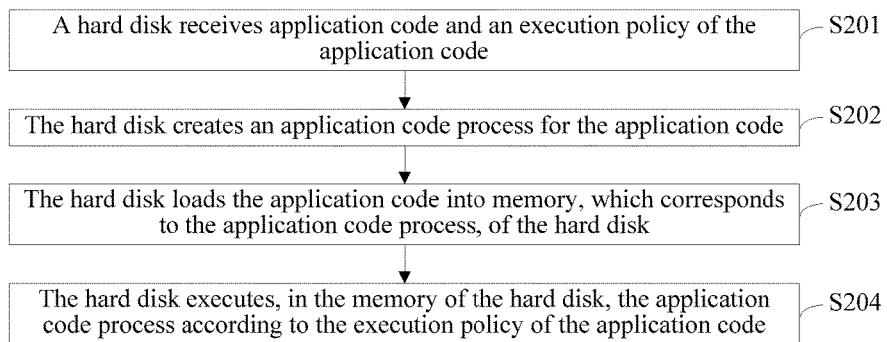
FIG. 2 is a flowchart diagram of another method for a hard disk to execute application code according to an embodiment of the present disclosure.

This embodiment of the present disclosure provides another method for a hard disk to execute application code. As shown in FIG. 2, the method may include the following steps.

Step S201: A hard disk receives application code and an execution policy of the application code.

The hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

If a user needs to use the hard disk to perform some specified operations (some functions that the user needs to extend in the hard disk), for example, performing virus scanning for the hard disk, performing integrity check on hard disk data, compressing the hard disk data, performing garbage collection on the hard disk, migrating and copying the hard disk data to another hard disk, encrypting the hard disk data based on a key provided by the user, and executing a policy customized by the user, the user may write application code of these specified operations, and set execution policies of the application code of these specified operations such that the user can send the application code and the execution policies of the application code to the hard disk using a client and a deployed server, that is, the hard disk receives application code and an execution policy of the application code that are sent by the server, where the execution policy of the application code may be preset according to an actual need.

It should be noted that, in the method for a hard disk to execute application code provided in this embodiment of the present disclosure, the server may include a data plane interface and a management plane interface. In the method for a hard disk to execute application code provided in this embodiment, the application code and the execution policy of the application code may be transmitted to the hard disk using the management plane interface of the server or the data plane interface of the server.

Further, the application code provided in this embodiment is application code that can be directly executed by the hard disk, that is, the application code is application code in a binary format. Therefore, when transmitting the application code to the hard disk, the server may perform the transmission using the management plane interface of the server, or may perform the transmission using the data plane interface of the server.

Further, the application code and the execution policy of the application code may be transmitted to the hard disk using the management plane interface of the server and invoking a management API of the hard disk, or the application code and the execution policy of the application code may be transmitted to the hard disk using the data plane interface of the server and invoking a data API of the hard disk. The server may transmit, in a firmware loading manner, the application code to the hard disk using the management plane interface of the server.

Particularly, the management API of the hard disk provided in this embodiment of the present disclosure may be an interface on a management plane of the hard disk. Accordingly, the data API of the hard disk may be an interface on a data plane of the hard disk, where the data API is an interface that is located on a plane that is the same as a plane on which a Key-Value interface of the hard disk is located.

It should be noted that, in the method for a hard disk to execute application code provided in this embodiment of the present disclosure, application code that may be executed by the hard disk includes but is not limited to the application code of the operations specified by the user, that is, the application code provided in this embodiment of the present disclosure may be written by the user according to an actual need, and is not limited in the present disclosure.

Further, the execution policy of the application code may include at least one of a trigger condition for executing the application code, an execution condition of the application code, or an operation after the execution of the application code is completed, and an identifier of the application code, a start position of the application code, and a length of the application code. Further, for example, the trigger condition for executing the application code may include that the hard disk executes the application code if having not received an external service request for 24 hours. The execution condition of the application code may include exiting after the execution of the application code is completed, or executing the application code again when a fault occurs during the execution of the application code. The operation after the execution of the application code is completed may include recording an execution log into a specified log area of the hard disk after the execution of the application code is completed, or sending an execution log to an external network management system server after the execution of the application code is completed. The identifier of the application code may be used to indicate that the application code is application code provided in this embodiment of the present disclosure, that is, extended application code provided by the user, and the start position of the application code may be used to indicate a start address at which the application code is stored. After the hard disk receives the execution policy of the application code, the hard disk may determine, according to the identifier of the application code, that the application code is the extended application code provided by the user, acquire the application code according to the start position of the application code and the length of the application code, and execute the application code according to the execution policy of the application code.

Particularly, in the execution policy of the application code provided in this embodiment of the present disclosure, in addition to the identifier of the application code, the start position of the application code, and the length of the application code, the execution policy of the application code includes but is not limited to those described above, that is, the execution policy of the application code provided in this embodiment of the present disclosure may be set according to an actual execution need, and is not limited in the present disclosure.

Step S202: The hard disk creates an application code process for the application code.

After the hard disk receives the application code, the hard disk may create the application code process for the application code, that is, the hard disk may create an application code process corresponding to the application code.

It may be understood that, a process is a basis of a structure of an operating system, is a dynamic execution of a program, is a running instance of the program, is an activity that occurs when the program and data of the program are executed in sequence in a processor, is a process in which the program runs on a data set, and is an independent unit for the system to perform resource allocation and scheduling. Exemplarily, the application code process provided in this embodiment of the present disclosure is a dynamic execution of an application code program, and is a running instance of the application code program.

Step S203: The hard disk loads the application code into memory, which corresponds to the application code process, of the hard disk.

After the hard disk creates the application code process, the hard disk may load the application code into the memory, which corresponds to the application code process, of the hard disk.

Further, for the method for a hard disk to execute application code provided in this embodiment of the present disclosure, the application code process created by the hard disk in step S202 is a management structure of the process, that is, the application code process created by the hard disk is a program architecture, and the application code process is a running instance of the application code program in the memory of the hard disk only after the application code is loaded by the program architecture into the memory, which corresponds to the application code process, of the hard disk in step S203.

Step S204: The hard disk executes, in the memory of the hard disk, the application code process according to the execution policy of the application code.

After the hard disk loads the application code into the memory, which corresponds to the application code process, of the hard disk, the hard disk may execute, in the memory of the hard disk, the application code process according to the execution policy of the application code, that is, the hard disk may execute the application code in the memory of the hard disk in a process manner.

This embodiment of the present disclosure provides another method for a hard disk to execute application code.

A hard disk receives application code and an execution policy of the application code, the hard disk creates an application code process for the application code, and the hard disk loads the application code into memory, which corresponds to the application code process, of the hard disk such that the hard disk executes, in the memory of the hard disk, the application code process according to the execution policy of the application code. By means of the solution, a hard disk may receive application code that is from outside of the hard disk (for example, customized application code) and an execution policy of the application code, and execute, in a process manner, the application code according to the execution policy, that is, the hard disk can support a manner of accessing the hard disk based on application code that is from outside of the hard disk, thereby improving performance of the hard disk, and improving a capability of a client to interact with the hard disk.

Embodiment 2

Figure 3:
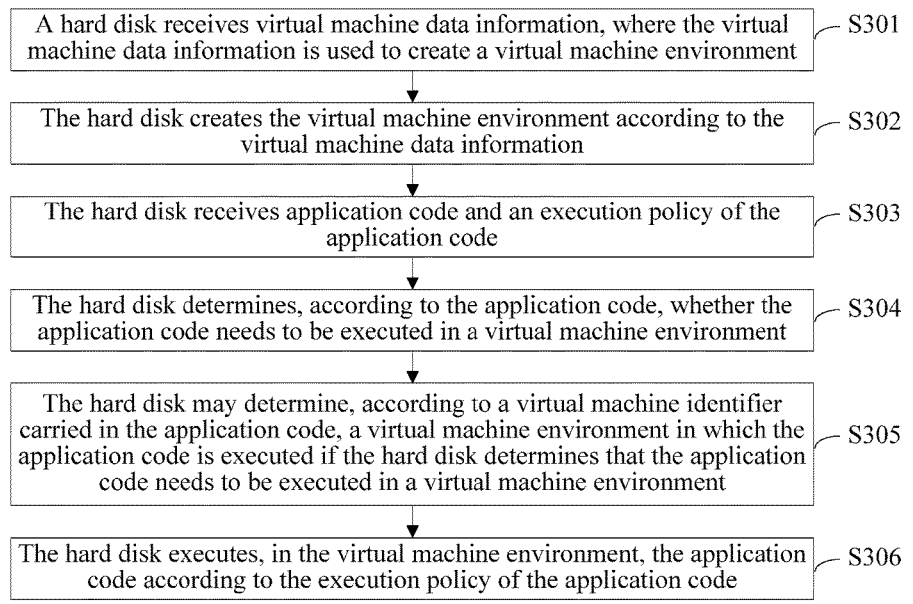
FIG. 3 is a flowchart diagram of a method for a hard disk to execute application code according to an embodiment of the present disclosure.

As shown in FIG. 3, this embodiment of the present disclosure provides a method for a hard disk to execute application code, where the method may include the following steps.

Step S301: A hard disk receives virtual machine data information, where the virtual machine data information is used to create a virtual machine environment.

The hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

If a user needs to use the hard disk to perform some specified operations (some functions that the user needs to extend in the hard disk), for example, performing virus scanning for the hard disk, performing integrity check on hard disk data, compressing the hard disk data, performing garbage collection on the hard disk, migrating and copying the hard disk data to another hard disk, encrypting the hard disk data based on a key provided by the user, and executing a policy customized by the user, the user may write application code of these specified operations. To save a system resource of the hard disk, the user may generally write the application code of these specified operations using a programming language. The application code of these specified operations that is written using the programming language needs to be executed relying on a corresponding virtual machine, that is, the application code of these specified operations needs to be executed in a corresponding virtual machine environment. Therefore, the hard disk needs to first create a running environment corresponding to the virtual machine, that is, the virtual machine environment when the hard disk executes, for the first time, application code written using a programming language. Further, the hard disk receives virtual machine data information, where the virtual machine data information is used to create the virtual machine environment.

Particularly, the virtual machine data information may include a virtual machine identifier, where the virtual machine identifier may be a name of the virtual machine, may be a type of the virtual machine, may be the name of the virtual machine and the type of the virtual machine, or may be any other identifier that meets a differentiating requirement, and is not limited in the present disclosure.

For example, if the virtual machine data information is JVM data, the virtual machine data information may include a JVM identifier (a JVM name and/or a JVM type). Further, the name of the virtual machine included in the virtual machine data information may be JVM, and the type of the virtual machine included in the virtual machine data information may be the JVM type, where the JVM type may be "JVM XXXX" ("XXXX" may be used to indicate a version number of the JVM or an identifier of a vendor that manufactures the JVM).

Step S302: The hard disk creates the virtual machine environment according to the virtual machine data information.

After the hard disk receives the virtual machine data information, the hard disk may create the virtual machine environment according to the virtual machine data information.

Generally, virtual machines in a computer and running environments formed by the virtual machines are mostly common. If a general "virtual machine" refers to software and hardware of the virtual machine, a "virtual machine environment" is the virtual machine that is running.

For example, the virtual machine environment is a JVM environment if the virtual machine is a JVM.

Step S303: The hard disk receives application code and an execution policy of the application code.

In this embodiment of the present disclosure, after a user writes application code of specified operations according to an actual need, and sets execution policies of the application code of these specified operations, the user may send the application code and the execution policies corresponding to the application code to the hard disk using a client and a deployed server, that is, the hard disk receives application code and an execution policy of the application code that are sent by the server, where the execution policy of the application code may be preset according to an actual need.

It should be noted that, in the method for a hard disk to execute application code provided in this embodiment of the present disclosure, the server may include a data plane interface and a management plane interface. In the method for a hard disk to execute application code provided in this embodiment, the application code and the execution policy of the application code may be transmitted to the hard disk using the data plane interface of the server.

Further, the application code provided in this embodiment is application code that needs to be executed in a virtual machine environment, that is, the application code is application code written using a programming language. Therefore, the transmission may be performed using the data plane interface of the server when the server transmits the application code to the hard disk.

Further, the application code and the execution policy of the application code may be transmitted to the hard disk using the data plane interface of the server and invoking a data API of the hard disk.

Particularly, the data API provided in this embodiment of the present disclosure may be an interface on a hard disk data plane, where the data API is an interface that is located on a plane that is the same as a plane on which a Key-Value interface of the hard disk is located.

It should be noted that, in the method for a hard disk to execute application code provided in this embodiment of the present disclosure, application code that may be executed by the hard disk includes but is not limited to the application code of the operations specified by the user, that is, the application code provided in this embodiment of the present disclosure may be written by the user according to an actual need, and is not limited in the present disclosure.

Further, the execution policy of the application code may include at least one of a trigger condition for executing the application code, an execution condition of the application code, or an operation after the execution of the application code is completed. Further, for example, the trigger condition for executing the application code may include that the hard disk executes the application code if having not received an external service request for 24 hours. The execution condition of the application code may include exiting after the execution of the application code is completed, or executing the application code again when a fault occurs during the execution of the application code. The operation after the execution of the application code is completed may include recording an execution log into a specified log area of the hard disk after the execution of the application code is completed, or sending an execution log to an external network management system server after the execution of the application code is completed.

It may be understood that, the execution policy of the application code provided in this embodiment of the present disclosure includes but is not limited to those described above, that is, the execution policy of the application code provided in this embodiment of the present disclosure may be set according to an actual execution need, and is not limited in the present disclosure.

Step S304: The hard disk determines, according to the application code, whether the application code needs to be executed in a virtual machine environment.

After the hard disk receives the application code, the hard disk may determine, according to the application code, whether the application code needs to be executed in the virtual machine environment.

Particularly, the application code may also include a virtual machine identifier, where the virtual machine identifier may be a name of the virtual machine, may be a type of the virtual machine, may be the name of the virtual machine and the type of the virtual machine, or may be any other identifier that meets a differentiating requirement, and is not limited in the present disclosure.

For example, the application code may include a JVM identifier (a JVM name and/or a JVM type) if the application code is JAVA bytecode, that is, application code that needs to be executed in a JVM environment. Further, the name of the virtual machine included in the application code may be JVM, and the type of the virtual machine included in the application code may be the JVM type, where the JVM type may be "JVM XXXX" ("XXXX" may be used to indicate a version number of the JVM or an identifier of a vendor that manufactures the JVM).

In a possible implementation manner, if application code carries a virtual machine identifier, the hard disk may determine, according to the virtual machine identifier carried in the application code, a virtual machine environment in which the application code is executed. Otherwise, if application code does not carry a virtual machine identifier, the hard disk may determine that the application code does not need to be executed in a virtual machine environment.

It should be noted that, in the present disclosure, a sequence in which steps S301-S302 and steps S303-S304 are performed may not be limited, that is, in the present disclosure, steps S301-S302 may be performed first, and then steps S303-S304 are performed, or steps S303-S304 may be performed first, and then steps S301-S302 are performed, or steps S301-S302 and steps S303-S304 may be performed simultaneously.

Step S305: The hard disk may determine, according to a virtual machine identifier carried in the application code, a virtual machine environment in which the application code is executed if the hard disk determines that the application code needs to be executed in a virtual machine environment.

After the hard disk determines that the application code needs to be executed in a virtual machine environment, the hard disk may further determine, according to a virtual machine identifier carried in the application code, a virtual machine environment in which the application code is executed.

Exemplarily, the hard disk may determine, according to the JVM, that the virtual machine environment in which the application code is executed is a JVM environment if the virtual machine identifier carried in the application code is JVM.

Further, it indicates that the application code is application code that can be executed based on only a virtual machine, that is, it indicates that the application code is application code designed using a programming language if the application code needs to be executed in a virtual machine environment. Therefore, the hard disk may interpret and execute the application code based on the virtual machine, that is, the hard disk may interpret and execute the application code in the virtual machine environment, that is, in the virtual machine that is running when executing the application code.

Exemplarily, if the application code is JAVA bytecode and the virtual machine is a JVM, when executing the JAVA bytecode, the hard disk needs to interpret and execute the JAVA bytecode in the JVM environment, that is, interpret and execute the application code in the JVM that is running. The JAVA bytecode is code obtained after original JAVA code is compiled.

For example, correspondences between a virtual machine, a virtual machine environment, and application code that needs to be executed in the virtual machine environment that are provided in this embodiment of the present disclosure may include any one of the following.

(1) The virtual machine is a JVM, the virtual machine environment is a JVM environment, and the application code that needs to be executed in the virtual machine environment is JAVA bytecode that needs to be executed in the JVM environment.

(2) The virtual machine is a script engine, the virtual machine environment is a script engine environment, and the application code that needs to be executed in the virtual machine environment is script code that needs to be executed in the script engine environment.

(3) The virtual machine is an SQL engine, the virtual machine environment is an SQL engine environment, and the application code that needs to be executed in the virtual machine environment is an SQL statement that needs to be executed in the SQL engine environment.

(4) The virtual machine is an engine customized by a user, the virtual machine environment is an engine environment customized by the user, and the application code that needs to be executed in the virtual machine environment is code that needs to be executed in the engine environment customized by the user.

It should be noted that, the four correspondences between the virtual machine, the virtual machine environment, and the application code that needs to be executed in the virtual machine environment are only exemplary for description, that is, the correspondences between the virtual machine, the virtual machine environment, and the application code that needs to be executed in the virtual machine environment that are provided in this embodiment of the present disclosure include but are not limited to the four. A correspondence, which is designed in another manner that meets an actual design requirement, between a virtual machine, a virtual machine environment, and application code that needs to be executed in the virtual machine environment also falls within the protection scope of the present disclosure.

Step S306: The hard disk executes, in the virtual machine environment, the application code according to the execution policy of the application code.

After the hard disk determines the virtual machine environment in which the application code can be executed, the hard disk may execute, in the virtual machine environment, the application code according to the execution policy of the application code.

Figure 4:
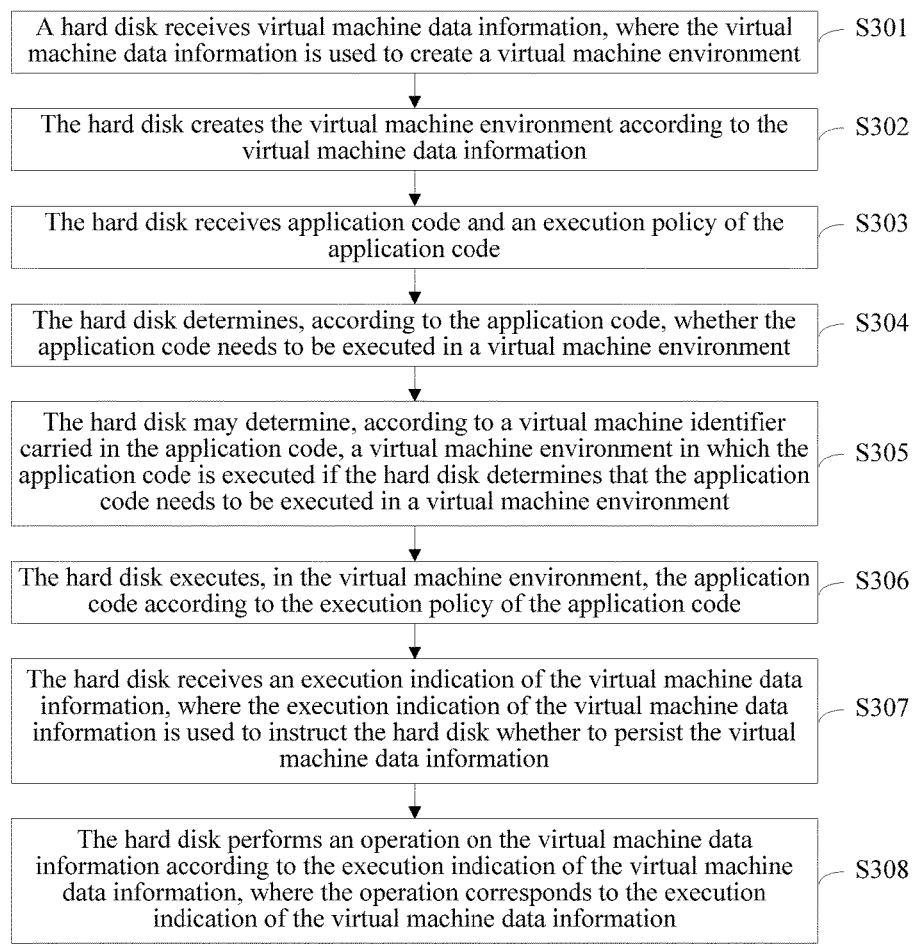
FIG. 4 is a flowchart diagram of a method for a hard disk to execute application code according to an embodiment of the present disclosure.

Optionally, as shown in FIG. 4, the method for a hard disk to execute application code provided in this embodiment of the present disclosure may further include the following steps.

Step S307: The hard disk receives an execution indication of the virtual machine data information, where the execution indication of the virtual machine data information is used to instruct the hard disk whether to persist the virtual machine data information.

The hard disk receives the execution indication of the virtual machine data information, where the execution indication of the virtual machine data information may be preset according to an actual need, and the execution indication of the virtual machine data information may be used to indicate whether the hard disk needs to persist the virtual machine data information.

Persistence refers to storing data (such as an object in memory of a hard disk) to a storage device in which the data can be stored permanently, such as a magnetic disk. Main application of the persistence is storing an object in memory into a relational database, a magnetic disk file, an extensible markup language (XML) data file, or the like. Exemplarily, JAVA database connectivity (JDBC) is a persistence mechanism, and file input/output (TO) is also a persistence mechanism.

Further, the execution indication of the virtual machine data information provided in this embodiment of the present disclosure may further include persisting the virtual machine data information in a storage medium of the hard disk, or running, in the memory of the hard disk, the virtual machine data information and not persisting the virtual machine data information. The storage medium of the hard disk may be a hard disk medium or a flash memory of the hard disk.

Step S308: The hard disk performs an operation on the virtual machine data information according to the execution indication of the virtual machine data information, where the operation corresponds to the execution indication of the virtual machine data information.

After the hard disk receives the execution indication of the virtual machine data information, the hard disk may perform the operation on the virtual machine data information according to the execution indication of the virtual machine data information, where the operation corresponds to the execution indication of the virtual machine data information. Further, the hard disk persists the virtual machine data information in the storage medium of the hard disk according to the execution indication of the virtual machine data information if the execution indication of the virtual machine data information instructs the hard disk to persist the virtual machine data information in the storage medium of the hard disk, or the hard disk runs, in the memory of the hard disk, the virtual machine data information and does not persist the virtual machine data information if the execution indication of the virtual machine data information instructs the hard disk to run, in the memory of the hard disk, the virtual machine data information and not to persist the virtual machine data information, according to the execution indication of the virtual machine data information.

It should be noted that, in the method for a hard disk to execute application code provided in this embodiment of the present disclosure, the operation performed by the hard disk on the virtual machine data information, that is, the execution indication of the virtual machine data information, may be set to a default configuration. In this way, the hard disk does not need to perform step S307 and step S308, that is, the hard disk needs to perform step S307 and step S308 only when the execution indication is set for the operation performed by the hard disk on the virtual machine data information.

Further, in the present disclosure, a sequence in which step S307 and step S301 are performed may not be limited, that is, in the present disclosure, step S307 may be performed first, and then step S301 is performed, or step S301 may be performed first, and then step S307 is performed, or step S307 and step S301 may be performed simultaneously.

Further, in the present disclosure, a sequence in which step S307 and step S303 are performed may also not be limited, that is, in the present disclosure, step S307 may be performed first, and then step S303 is performed, or step S303 may be performed first, and then step S307 is performed, or step S307 and step S303 may be performed simultaneously.

Figure 5:
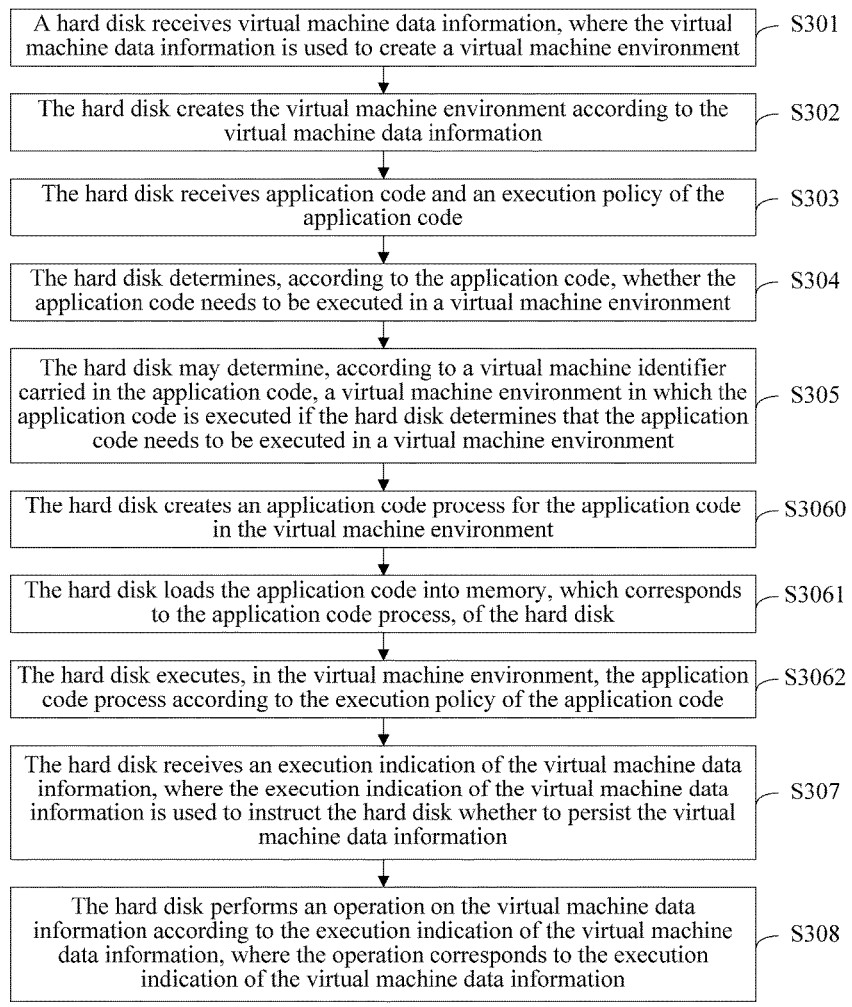
FIG. 5 is a flowchart diagram of a method for a hard disk to execute application code according to an embodiment of the present disclosure.

Further, as shown in FIG. 5, in the method for a hard disk to execute application code provided in this embodiment of the present disclosure, step S306 of executing, by the hard disk in the virtual machine environment, the application code according to the execution policy of the application code may further include the following steps.

Step S3060: The hard disk creates an application code process for the application code in the virtual machine environment.

After the hard disk determines the virtual machine environment in which the application code is executed, the hard disk may create the application code process for the application code in the virtual machine environment if the hard disk needs to execute the application code in the virtual machine environment.

It may be understood that, a process is a basis of a structure of an operating system, is a dynamic execution of a program, is a running instance of the program, is an activity that occurs when the program and data of the program are executed in sequence in a processor, is a process in which the program runs on a data set, and is an independent unit for the system to perform resource allocation and scheduling. Exemplarily, the application code process provided in this embodiment of the present disclosure is a dynamic execution of an application code program, and is a running instance of the application code program.

Step S3061: The hard disk loads the application code into memory, which corresponds to the application code process, of the hard disk.

After the hard disk creates the application code process for the application code in the virtual machine environment, the hard disk may load the application code into the memory, which corresponds to the application code process, of the hard disk.

Further, for the method for a hard disk to execute application code provided in this embodiment of the present disclosure, the application code process created by the hard disk in step S3060 is a management structure of the process, that is, the application code process created by the hard disk is a program architecture, and the application code process is a running instance of the application code program in the memory of the hard disk only after the application code is loaded by the program architecture into the memory, which corresponds to the application code process, of the hard disk in step S3061.

Step S3062: The hard disk executes, in the virtual machine environment, the application code process according to the execution policy of the application code.

After the hard disk loads the application code into the memory, which corresponds to the application code process, of the hard disk, the hard disk may execute, in the virtual machine environment, the application code process according to the execution policy of the application code.

It should be noted that, in the method for a hard disk to execute application code provided in this embodiment of the present disclosure, the hard disk may perform step S305 and step S306, that is, the hard disk may first determine, according to a virtual machine identifier carried in the application code, a virtual machine environment in which the application code is executed, create an application code process for the application code in the virtual machine environment, load the application code into memory, which corresponds to the application code process, of the hard disk, and execute, in the virtual machine environment, the application code process according to an execution policy of the application code when the hard disk determines that application code received by the hard disk needs to be executed in a virtual machine environment.

Further, after the hard disk creates the virtual machine environment corresponding to the virtual machine data information, subsequently the hard disk may continue to receive another application code that needs to be executed in the virtual machine environment, and after receiving the other application code, the hard disk may directly create another application code process in the virtual machine environment for the other application code.

For example, if the hard disk receives application code A and application code B, where the application code A and the application code B are both executed in a virtual machine environment, when the hard disk receives the application code A, the hard disk may create an application code A process in the virtual machine environment for the application code A, load the application code A into memory, which corresponds to the application code A process, of the hard disk, and execute the application code A process in the virtual machine environment, and when the hard disk receives the application code B, the hard disk may create an application code B process in the virtual machine environment for the application code B, load the application code B into memory, which corresponds to the application code B process, of the hard disk, and execute the application code B process in the virtual machine environment. That is, the hard disk may execute the application code A process and the application code B process in the virtual machine environment.

Further, the application code in this embodiment needs to be executed in the virtual machine environment. In the method, a transmission channel for data such as the application code that needs to be executed in the virtual machine environment, the execution policy of the application code, the virtual machine data information, and the virtual machine identifier may be the same as a transmission channel for Key-Value data.

Further, an application-layer transmission channel for the data provided in this embodiment of the present disclosure such as the application code that needs to be executed in the virtual machine environment, the execution policy of the application code, the virtual machine data information, and the virtual machine identifier may be implemented in a Hypertext Transfer Protocol (HTTP) manner. For example, application code that needs to be executed in a virtual machine environment, an execution policy for executing the application code, specific virtual machine data information in a binary format, that the data information is virtual machine data information, and a virtual machine identifier may be specified in an HTTP message body.

Further, the application-layer transmission channel for the data provided in this embodiment of the present disclosure such as the application code that needs to be executed in the virtual machine environment, the execution policy of the application code, the virtual machine data information, and the virtual machine identifier may also be implemented using another customized protocol other than the HTTP, where the customized protocol may provide semantic descriptions of the data such as the application code that needs to be executed in the virtual machine environment, the execution policy of the application code, the virtual machine data information, and the virtual machine identifier.

This embodiment of the present disclosure provides a method for a hard disk to execute application code. A hard disk receives application code and an execution policy of application code, and determines whether the application code needs to be executed in a virtual machine environment, and the hard disk executes, in the virtual machine environment, the application code according to the execution policy of the application code if the hard disk determines that the application code needs to be executed in the virtual machine environment. By means of the solution, a hard disk may receive application code that is from outside of the hard disk (for example, customized application code) and an execution policy of the application code, and execute, in a virtual machine environment, the application code according to the execution policy, that is, the hard disk can support a manner of accessing the hard disk based on application code that is from outside of the hard disk, thereby improving performance of the hard disk, and improving a capability of a client to interact with the hard disk.

Figure 6:
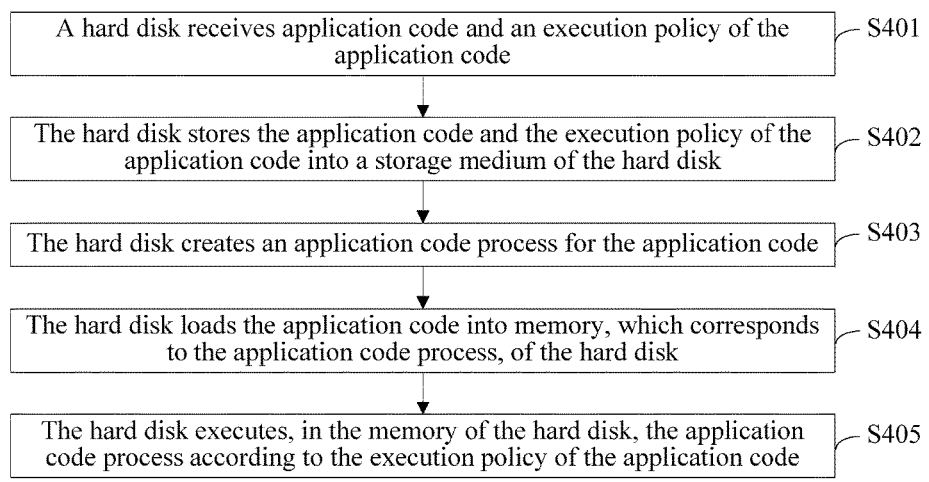
FIG. 6 is a flowchart diagram of another method for a hard disk to execute application code according to an embodiment of the present disclosure.

This embodiment of the present disclosure provides another method for a hard disk to execute application code. As shown in FIG. 6, the method may include the following steps.

Step S401: A hard disk receives application code and an execution policy of the application code.

The hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

If a user needs to use the hard disk to perform some specified operations (some functions that the user needs to extend in the hard disk), for example, performing virus scanning for the hard disk, performing integrity check on hard disk data, compressing the hard disk data, performing garbage collection on the hard disk, migrating and copying the hard disk data to another hard disk, encrypting the hard disk data based on a key provided by the user, and executing a policy customized by the user, the user may write application code of these specified operations, and set execution policies of the application code of these specified operations such that the user can send the application code and the execution policies of the application code to the hard disk using a client and a deployed server, that is, the hard disk receives application code and an execution policy of the application code that are sent by the server, where the execution policy of the application code may be preset according to an actual need.

It should be noted that, in the method for a hard disk to execute application code provided in this embodiment of the present disclosure, the server may include a data plane interface and a management plane interface. In the method for a hard disk to execute application code provided in this embodiment, the application code and the execution policy of the application code may be transmitted to the hard disk using the management plane interface of the server or the data plane interface of the server.

Further, the application code provided in this embodiment is application code that can be directly executed by the hard disk, that is, the application code is application code in a binary format. Therefore, the server may perform the transmission using the management plane interface of the server, or may perform the transmission using the data plane interface of the server when transmitting the application code to the hard disk.

Further, the application code and the execution policy of the application code may be transmitted to the hard disk using the management plane interface of the server and invoking a management API of the hard disk, or the application code and the execution policy of the application code may be transmitted to the hard disk using the data plane interface of the server and invoking a data API of the hard disk. The server may transmit, in a firmware loading manner, the application code to the hard disk using the management plane interface of the server.

Particularly, the management API of the hard disk provided in this embodiment of the present disclosure may be an interface on a management plane of the hard disk. Accordingly, the data API of the hard disk may be an interface on a data plane of the hard disk, where the data API is an interface that is located on a plane that is the same as a plane on which a Key-Value interface of the hard disk is located.

It should be noted that, in the method for a hard disk to execute application code provided in this embodiment of the present disclosure, application code that may be executed by the hard disk includes but is not limited to the application code of the operations specified by the user, that is, the application code provided in this embodiment of the present disclosure may be written by the user according to an actual need, and is not limited in the present disclosure.

Further, the execution policy of the application code may include at least one of a trigger condition for executing the application code, an execution condition of the application code, or an operation after the execution of the application code is completed, and an identifier of the application code, a start position of the application code, and a length of the application code. Further, for example, the trigger condition for executing the application code may include that the hard disk executes the application code if having not received an external service request for 24 hours. The execution condition of the application code may include exiting after the execution of the application code is completed, or executing the application code again when a fault occurs during the execution of the application code. The operation after the execution of the application code is completed may include recording an execution log into a specified log area of the hard disk after the execution of the application code is completed, or sending an execution log to an external network management system server after the execution of the application code is completed. The identifier of the application code may be used to indicate that the application code is application code provided in this embodiment of the present disclosure, that is, extended application code provided by the user, and the start position of the application code may be used to indicate a start address at which the application code is stored. After the hard disk receives the execution policy of the application code, the hard disk may determine, according to the identifier of the application code, that the application code is the extended application code provided by the user, acquire the application code according to the start position of the application code and the length of the application code, and execute the application code according to the execution policy of the application code.

It may be understood that, in the execution policy of the application code provided in this embodiment of the present disclosure, in addition to the identifier of the application code, the start position of the application code, and the length of the application code, the execution policy of the application code includes but is not limited to those described above, that is, the execution policy of the application code provided in this embodiment of the present disclosure may be set according to an actual execution need, and is not limited in the present disclosure.

Step S402: The hard disk stores the application code and the execution policy of the application code into a storage medium of the hard disk.

The hard disk may store the application code and the execution policy of the application code into the storage medium of the hard disk after the hard disk receives the application code and the execution policy of the application code, where the storage medium of the hard disk may be a hard disk medium or a flash memory of the hard disk.

Particularly, in this embodiment, the application code loaded from the server into the hard disk is application code in a binary format. Therefore, after the hard disk receives the application code, the hard disk may directly execute the application code in a process manner, and does not need to interpret and execute the application code in a corresponding virtual machine environment.

Step S403: The hard disk creates an application code process for the application code.

After the hard disk receives the application code, the hard disk may create the application code process for the application code, that is, the hard disk may create an application code process corresponding to the application code.

It may be understood that, a process is a basis of a structure of an operating system, is a dynamic execution of a program, is a running instance of the program, is an activity that occurs when the program and data of the program are executed in sequence in a processor, is a process in which the program runs on a data set, and is an independent unit for the system to perform resource allocation and scheduling. Exemplarily, the application code process provided in this embodiment of the present disclosure is a dynamic execution of an application code program, and is a running instance of the application code program.

Step S404: The hard disk loads the application code into memory, which corresponds to the application code process, of the hard disk.

After the hard disk creates the application code process, the hard disk may load the application code into the memory, which corresponds to the application code process, of the hard disk.

Further, for the method for a hard disk to execute application code provided in this embodiment of the present disclosure, the application code process created by the hard disk in step S403 is a management structure of the process, that is, the application code process created by the hard disk is a program architecture, and the application code process is a running instance of the application code program in the memory of the hard disk only after the application code is loaded by the program architecture into the memory, which corresponds to the application code process, of the hard disk in step S404.

Step S405: The hard disk executes, in the memory of the hard disk, the application code process according to the execution policy of the application code.

After the hard disk loads the application code into the memory, which corresponds to the application code process, of the hard disk, the hard disk may execute, in the memory of the hard disk, the application code process according to the execution policy of the application code, that is, the hard disk may execute the application code in the memory of the hard disk in a process manner.

Further, the application code in this embodiment does not need to be executed in a virtual machine environment. In the method, a transmission channel for data such as the application code and the execution policy of the application code may be the same as a transmission channel for Key-Value data.

Further, an application-layer transmission channel for the data provided in this embodiment of the present disclosure such as the application code and the execution policy of the application code may be implemented in an HTTP manner. For example, specific application code in a binary format and an execution policy of the application code may be specified in an HTTP message body.

Further, the application-layer transmission channel for the data provided in this embodiment of the present disclosure such as the application code and the execution policy of the application code may also be implemented using another customized protocol other than the HTTP, where the customized protocol may provide semantic descriptions of the data such as the application code and the execution policy of the application code.

This embodiment of the present disclosure provides another method for a hard disk to execute application code. The hard disk receives application code and an execution policy of the application code, the hard disk creates an application code process for the application code, and the hard disk loads the application code into memory, which corresponds to the application code process, of the hard disk such that the hard disk executes, in the memory of the hard disk, the application code process according to the execution policy of the application code. By means of the solution, a hard disk may receive application code that is from outside of the hard disk (for example, customized application code) and an execution policy of the application code, and execute, in a process manner, the application code according to the execution policy, that is, the hard disk can support a manner of accessing the hard disk based on application code that is from outside of the hard disk, thereby improving performance of the hard disk, and improving a capability of a client to interact with the hard disk.

Embodiment 3

Figure 7:
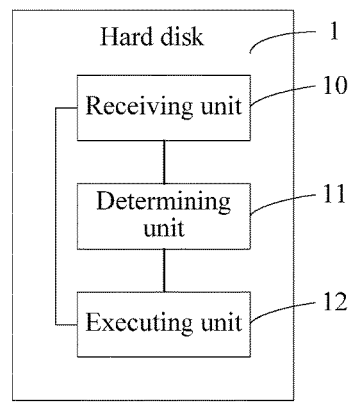
FIG. 7 is a schematic structural diagram of a hard disk according to an embodiment of the present disclosure.

As shown in FIG. 7, this embodiment of the present disclosure provides a hard disk 1, where the hard disk 1 corresponds to a method for a hard disk to execute application code provided in an embodiment of the present disclosure, and the hard disk 1 may include a receiving unit 10 configured to receive application code and an execution policy of the application code, a determining unit 11 configured to determine, according to the application code received by the receiving unit 10, whether the application code needs to be executed in a virtual machine environment, and an executing unit 12 configured to execute, in the virtual machine environment according to the execution policy of the application code received by the receiving unit 10, the application code received by the receiving unit 10 if the determining unit 11 determines that the application code needs to be executed in the virtual machine environment.

Figure 8:
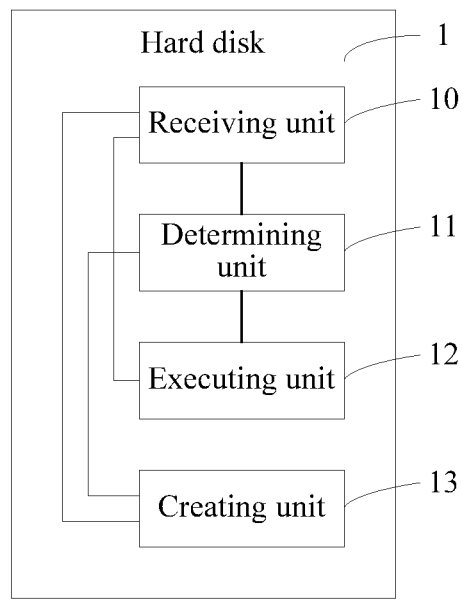
FIG. 8 is a schematic structural diagram of a hard disk according to an embodiment of the present disclosure.

Optionally, as shown in FIG. 8, the hard disk 1 may further include a creating unit 13, where the receiving unit 10 is further configured to receive virtual machine data information, where the virtual machine data information is used to create the virtual machine environment, and the creating unit 13 is configured to create the virtual machine environment according to the virtual machine data information received by the receiving unit 10.

Optionally, the application code carries a virtual machine identifier, and the determining unit 11 is further configured to determine, according to the virtual machine identifier carried in the application code, the virtual machine environment that is created by the creating unit 13 and in which the application code is executed.

Figure 9:
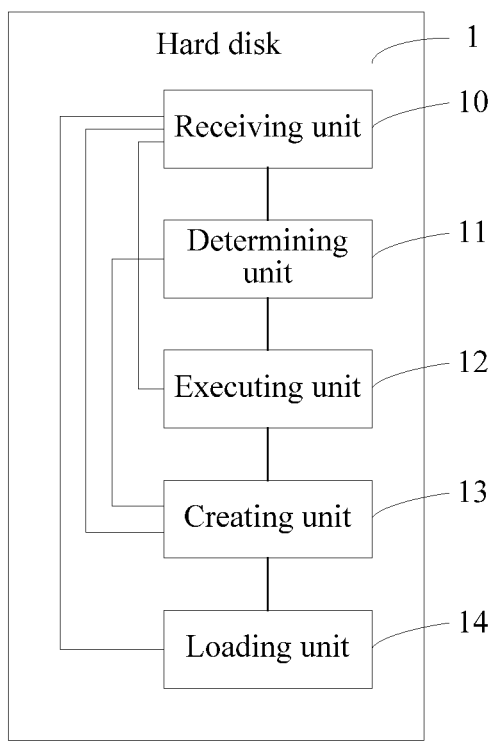
FIG. 9 is a schematic structural diagram of a hard disk according to an embodiment of the present disclosure.

Optionally, as shown in FIG. 9, the hard disk 1 may further include a loading unit 14, where the creating unit 13 is further configured to create an application code process in the virtual machine environment for the application code received by the receiving unit 10. The loading unit 14 is configured to load the application code received by the receiving unit 10 into memory, which corresponds to the application code process created by the creating unit 13, of the hard disk, and the executing unit 12 is further configured to execute, in the virtual machine environment created by the creating unit 13, the application code process, which is created by the creating unit 13, according to the execution policy of the application code received by the receiving unit 10.

Optionally, the receiving unit 10 is further configured to receive an execution indication of the virtual machine data information, where the execution indication of the virtual machine data information is used to instruct whether to persist the virtual machine data information, and the executing unit 12 is further configured to perform, according to the execution indication received by the receiving unit 10 of the virtual machine data information, an operation on the virtual machine data information received by the receiving unit 10, where the operation corresponds to the execution indication of the virtual machine data information.

Optionally, the execution policy of the application code received by the receiving unit 10 includes at least one of a trigger condition for executing the application code, an execution condition of the application code, or an operation after the execution of the application code is completed.

Optionally, the application code, the execution policy of the application code, the virtual machine data information, and the execution indication of the virtual machine data information are stored in a storage medium of the hard disk. The storage medium of the hard disk may include a hard disk medium or a flash memory of the hard disk. Further, the application code, the execution policy of the application code, the virtual machine data information, and the execution indication of the virtual machine data information may be stored in the hard disk medium, or the application code, the execution policy of the application code, the virtual machine data information, and the execution indication of the virtual machine data information may be stored in the flash memory of the hard disk, or the execution policy of the application code, the virtual machine data information, and the execution indication of the virtual machine data information may be partially stored in the hard disk medium, and partially stored in the flash memory of the hard disk, which is not limited in the present disclosure.

It should be noted that, the hard disk 1 provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

This embodiment of the present disclosure provides a hard disk. The hard disk receives application code and an execution policy of application code, and determines whether the application code needs to be executed in a virtual machine environment, and the hard disk executes, in the virtual machine environment, the application code according to the execution policy of the application code if the hard disk determines that the application code needs to be executed in the virtual machine environment. By means of the solution, a hard disk may receive application code that is from outside of the hard disk (for example, customized application code) and an execution policy of the application code, and execute, in a virtual machine environment, the application code according to the execution policy, that is, the hard disk can support a manner of accessing the hard disk based on application code that is from outside of the hard disk, thereby improving performance of the hard disk, and improving a capability of a client to interact with the hard disk.

Figure 10:
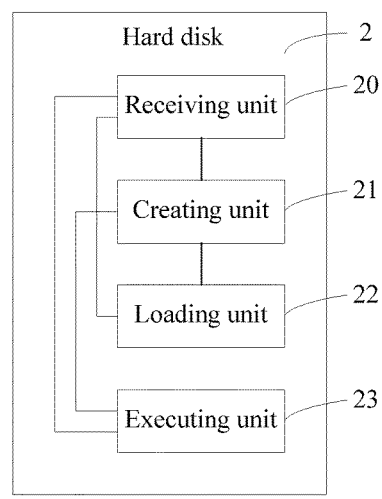
FIG. 10 is a schematic structural diagram of a hard disk according to an embodiment of the present disclosure.

As shown in FIG. 10, this embodiment of the present disclosure provides another hard disk 2, where the hard disk 2 corresponds to another method for a hard disk to execute application code provided in an embodiment of the present disclosure, and the hard disk 2 may include a receiving unit 20 configured to receive application code and an execution policy of the application code, a creating unit 21 configured to create an application code process for the application code received by the receiving unit 20, a loading unit 22 configured to load the application code received by the receiving unit 20 into memory, which corresponds to the application code process created by the creating unit 21, of the hard disk, and an executing unit 23 configured to execute the application code process, which is created by the creating unit 21, in the memory of the hard disk according to the execution policy of the application code received by the receiving unit 20.

Optionally, the execution policy of the application code received by the receiving unit 20 may include at least one of a trigger condition for executing the application code, an execution condition of the application code, or an operation after the execution of the application code is completed, and an identifier of the application code, a start position of the application code, and a length of the application code.

Optionally, the application code received by the receiving unit 20 is application code in a binary format.

Optionally, the application code and the execution policy of the application code are stored in a storage medium of the hard disk. The storage medium of the hard disk may include a hard disk medium or a flash memory of the hard disk. Further, the application code and the execution policy of the application code may be stored in the hard disk medium, or the application code and the execution policy of the application code may be stored in the flash memory of the hard disk, or the application code and the execution policy of the application code may be partially stored in the hard disk medium, and partially stored in the flash memory of the hard disk, which is not limited in the present disclosure.

It should be noted that, the hard disk 2 provided in this embodiment of the present disclosure may be an Ethernet interface hard disk (also referred to as a network hard disk), where the Ethernet interface hard disk may also be referred to as a smart hard disk, that is, the hard disk 2 provided in this embodiment of the present disclosure may be a hard disk that is based on an ARM system. The hard disk that is based on the ARM system integrates the ARM system into a conventional hard disk, to improve performance of the hard disk.

This embodiment of the present disclosure provides a hard disk. The hard disk receives application code and an execution policy of the application code, the hard disk creates an application code process for the application code, and the hard disk loads the application code into memory, which corresponds to the application code process, of the hard disk such that the hard disk executes, in the memory of the hard disk, the application code process according to the execution policy of the application code. By means of the solution, a hard disk may receive application code that is from outside of the hard disk (for example, customized application code) and an execution policy of the application code, and execute, in a process manner, the application code according to the execution policy, that is, the hard disk can support a manner of accessing the hard disk based on application code that is from outside of the hard disk, thereby improving performance of the hard disk, and improving a capability of a client to interact with the hard disk.

Embodiment 4

Figure 11:
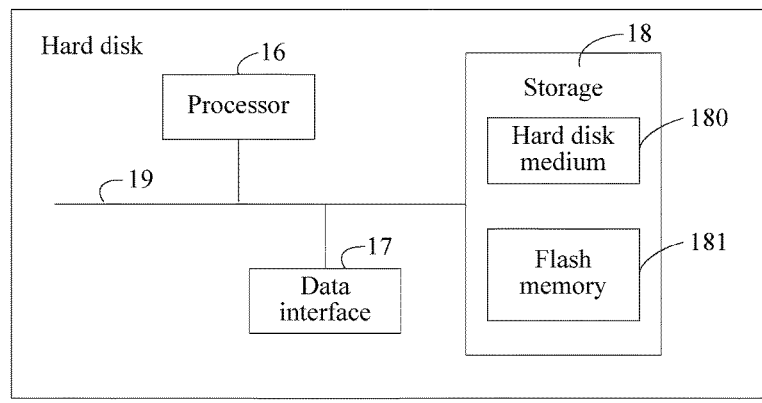
FIG. 11 is a schematic structural diagram of a hard disk according to an embodiment of the present disclosure.

As shown in FIG. 11, this embodiment of the present disclosure provides a hard disk, where the hard disk corresponds to a method for a hard disk to execute application code provided in an embodiment of the present disclosure, and the hard disk may include a processor 16 such as a central processing unit (CPU), at least one data interface 17, a storage 18, and a system bus 19. The system bus 19 is configured to implement connection and communication between these components. The storage 18 may include a random access memory (RAM), and may further include a non-volatile memory such as at least one magnetic disk storage. The storage 18 may optionally include at least one storage apparatus. Further, the storage 18 may be a storage medium of the hard disk, and the storage medium of the hard disk may include a hard disk medium 180 and a flash memory 181 of the hard disk.

In some implementation manners, the storage 18 stores the following elements, an executable module or a data structure, or a subset thereof, or an extension set thereof, an operating system, including various system programs configured to implement various basic services and process a hardware-based task, and an application module, including various application programs configured to implement various application services.

The application module includes but is not limited to the virtual machine environment, the application code process, and the like provided in the embodiments of the present disclosure.

When the hard disk runs, by running an internal execution instruction of the hard disk, the processor 16 may execute the method process in any one of FIG. 1, FIG. 3, FIG. 4, and FIG. 5, which further includes the processor 16 being configured to receive, from the data interface 17 using the system bus 19, application code and an execution policy of the application code, determine, according to the application code, whether the application code needs to be executed in a virtual machine environment, and execute, in the virtual machine environment, the application code according to the execution policy of the application code if the application code needs to be executed in a virtual machine environment, and the storage 18 being configured to store the application code and the execution policy of the application code, and configured to complete a software program of the foregoing process such that the processor 16 may complete the foregoing process by executing the software program and invoking the application code and the execution policy of the application code.

Further, the application code, the execution policy of the application code, and the software program that is configured to complete the foregoing process may be stored in the hard disk medium 180, or may be stored in the flash memory 181 of the hard disk, or may be partially stored in the hard disk medium 180, and partially stored in the flash memory 181 of the hard disk, which is not limited in the present disclosure.

Optionally, the processor 16 is further configured to receive, from the data interface 17 using the system bus 19, virtual machine data information, and create the virtual machine environment according to the virtual machine data information, where the virtual machine data information is used to create the virtual machine environment, and the storage 18 is further configured to store the virtual machine data information.

Optionally, the application code carries a virtual machine identifier, and the processor 16 is further configured to determine, according to the virtual machine identifier carried in the application code, the virtual machine environment in which the application code is executed.

Optionally, the processor 16 is further configured to create an application code process for the application code in the virtual machine environment, load, using the system bus 19, the application code into memory, which corresponds to the application code process, of the hard disk, and execute the application code process in the virtual machine environment.

Optionally, the processor 16 is further configured to receive, from the data interface 17 using the system bus 19, an execution indication of the virtual machine data information, and perform an operation on the virtual machine data information according to the execution indication of the virtual machine data information, where the operation corresponds to the execution indication of the virtual machine data information, and the execution indication of the virtual machine data information is used to instruct whether to persist the virtual machine data information, and the storage 18 is further configured to store the execution indication of the virtual machine data information.

Optionally, the execution policy of the application code received by the processor 16 includes at least one of a trigger condition for executing the application code, an execution condition of the application code, or an operation after the execution of the application code is completed.

Optionally, the virtual machine data information and the execution indication of the virtual machine data information may be stored in a storage medium of the hard disk. Further, the virtual machine data information and the execution indication of the virtual machine data information may be stored in the hard disk medium 180, or the virtual machine data information and the execution indication of the virtual machine data information may be stored in the flash memory 181 of the hard disk, or the virtual machine data information and the execution indication of the virtual machine data information may be partially stored in the hard disk medium 180, and partially stored in the flash memory 181 of the hard disk, which is not limited in the present disclosure.

It should be noted that, the hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

This embodiment of the present disclosure provides a hard disk. The hard disk receives application code and an execution policy of application code, and determines whether the application code needs to be executed in a virtual machine environment, and the hard disk executes, in the virtual machine environment, the application code according to the execution policy of the application code if the hard disk determines that the application code needs to be executed in the virtual machine environment. By means of the solution, a hard disk may receive application code that is from outside of the hard disk (for example, customized application code) and an execution policy of the application code, and execute, in a virtual machine environment, the application code according to the execution policy, that is, the hard disk can support a manner of accessing the hard disk based on application code that is from outside of the hard disk, thereby improving performance of the hard disk, and improving a capability of a client to interact with the hard disk.

Figure 12:
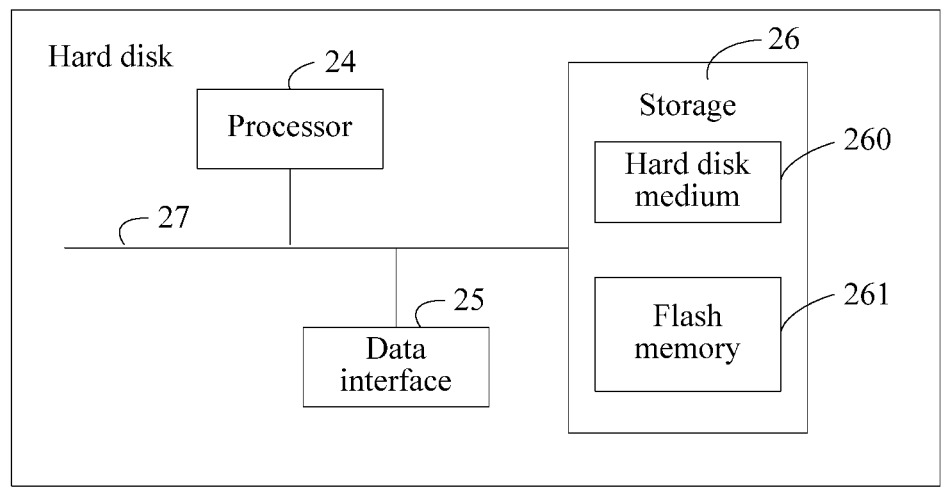
FIG. 12 is a schematic structural diagram of a hard disk according to an embodiment of the present disclosure.

As shown in FIG. 12, this embodiment of the present disclosure provides another hard disk, where the hard disk corresponds to another method for a hard disk to execute application code provided in an embodiment of the present disclosure, and the hard disk may include a processor 24 such as a CPU, at least one data interface 25, a storage 26, and a system bus 27. The system bus 27 is configured to implement connection and communication between these components. The storage 26 may include a RAM, and may further include a non-volatile memory such as at least one magnetic disk storage. The storage 26 may optionally include at least one storage apparatus, and further, the storage 26 may include a hard disk medium 260 and a flash memory 261 of the hard disk.

In some implementation manners, the storage 26 stores the following elements, an executable module or a data structure, or a subset thereof, or an extension set thereof, an operating system, including various system programs configured to implement various basic services and process a hardware-based task, and an application module, including various application programs configured to implement various application services.

The application module includes but is not limited to the application code process, and the like provided in the embodiments of the present disclosure.

When the hard disk runs, by running an internal execution instruction of the hard disk, the processor 24 may execute the method process in either of FIG. 2 and FIG. 6, which further includes the processor 24 being configured to receive, from the data interface 25 using the system bus 27, application code and an execution policy of the application code, create an application code process for the application code, load, using the system bus 27, the application code into memory, which corresponds to the application code process, of the hard disk, and execute, in the memory of the hard disk, the application code process according to the execution policy of the application code, and the storage 26 being configured to store the application code and the execution policy of the application code, and configured to complete a software program of the foregoing process such that the processor 24 may complete the foregoing process by executing the software program and invoking the application code and the execution policy of the application code.

Further, the application code, the execution policy of the application code, and the software program that is configured to complete the foregoing process may be stored in the hard disk medium 260, or may be stored in the flash memory 261 of the hard disk, or may be partially stored in the hard disk medium 260, and partially stored in the flash memory 261 of the hard disk, which is not limited in the present disclosure.

Optionally, the execution policy of the application code received by the processor 24 may include at least one of a trigger condition for executing the application code, an execution condition of the application code, or an operation after the execution of the application code is completed, and an identifier of the application code, a start position of the application code, and a length of the application code.

Optionally, the application code received by the processor 24 is application code in a binary format.

It should be noted that, the hard disk provided in this embodiment of the present disclosure may be an Ethernet interface hard disk (also referred to as a network hard disk), where the Ethernet interface hard disk may also be referred to as a smart hard disk, that is, the hard disk provided in this embodiment of the present disclosure may be a hard disk that is based on an ARM system. The hard disk that is based on the ARM system integrates the ARM system into a conventional hard disk, to improve performance of the hard disk.

This embodiment of the present disclosure provides a hard disk. The hard disk receives application code and an execution policy of the application code, the hard disk creates an application code process for the application code, and the hard disk loads the application code into memory, which corresponds to the application code process, of the hard disk such that the hard disk executes, in the memory of the hard disk, the application code process according to the execution policy of the application code. By means of the solution, a hard disk may receive application code that is from outside of the hard disk (for example, customized application code) and an execution policy of the application code, and execute, in a process manner, the application code according to the execution policy, that is, the hard disk can support a manner of accessing the hard disk based on application code that is from outside of the hard disk, thereby improving performance of the hard disk, and improving a capability of a client to interact with the hard disk.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for executing application code based on a manner of accessing a hard disk, wherein the hard disk comprises a processor, a data interface, and a hard disk medium that stores data, and wherein the method comprises:
  receiving, by the data interface and from a server, the application code, wherein the application code is related to the data, and wherein the application code carries a virtual machine identifier;
  determining, by the processor, according to the application code, whether to execute the application code in a virtual environment within the hard disk, wherein the virtual environment is used for running the application code; and
  executing, by the processor, the application code to process the data in the hard disk medium in response to determining to execute the application code in the virtual environment.

2. The method of claim 1, wherein, before receiving the application code, the method further comprises:
  receiving, by the processor, virtual data information for creating the virtual environment; and
  creating, by the processor, the virtual environment according to the virtual data information.

3. The method of claim 2, wherein, after executing the application code, the method further comprises:
  receiving, by the processor, an execution indication instructing the hard disk to store the virtual data information; and
  performing, by the processor, an operation on the virtual data information according to the execution indication.

4. The method of claim 1, wherein the virtual environment is a virtual machine environment.

5. The method of claim 1, wherein executing the application code comprises:
  creating, by the processor, an application code process for the application code in the virtual environment;
  loading, by the processor, the application code into a memory of the hard disk corresponding to the application code process; and
  executing, by the processor in the virtual environment, the application code process.

6. The method of claim 1, further comprising executing the application code according to an execution policy comprising a trigger condition for executing the application code.

7. The method of claim 1, further comprising executing the application code according to an execution policy comprising an execution condition of the application code.

8. The method of claim 1, further comprising executing the application code according to an execution policy comprising an operation to be executed after execution of the application code is completed.

9. A method for executing application code based on a manner of accessing a hard disk, wherein the hard disk comprises a processor, a random-access memory (RAM), a data interface, and a hard disk medium that stores data, and wherein the method comprises:
  receiving, by the data interface and from a server, the application code, wherein the application code is related to the data;
  creating, by the processor, an application code process for the application code, wherein the application code process is a dynamic execution of a program and is a unit of allocating and scheduling resources by an operating system;
  loading, by the hard disk, the application code into the RAM; and
  executing, by the processor, the application code process to process the data.

10. The method of claim 9, further comprising processing the data according to an execution policy of the application code, wherein the execution policy comprises:
  at least one of a trigger condition for executing the application code, an execution condition of the application code, or an operation to be executed after execution of the application code is completed;
  an identifier of the application code;
  a start position of the application code; or
  a length of the application code.

11. The method of claim 9, wherein the application code is in a binary format.

12. A hard disk comprising:
  an interface configured to receive an application code from a server, wherein the application code carries a virtual machine identifier;
  a storage configured to store the application code and data;
  a hard disk medium configured to store the application code and the data; and
  a processor coupled to the storage and configured to:
    determine, according to the application code, whether to execute the application code in a virtual environment, wherein the virtual environment is for running the application code; and
    execute, in the virtual environment, the application code to process the data in the hard disk medium when the application code is determined to be executed in the virtual environment.

13. The hard disk of claim 12, wherein the processor is further configured to:
  receive virtual data information; and
  create the virtual environment according to the virtual data information, wherein the storage is further configured to store the virtual data information.

14. The hard disk of claim 13, wherein the processor is further configured to:
  receive an execution indication instructing whether to store the virtual data information; and
  perform an operation on the virtual data information according to the execution indication, and
  wherein the storage is further configured to store the execution indication of the virtual data information.

15. The hard disk of claim 12, wherein the virtual environment is a virtual machine environment, and wherein the processor is further configured to determine, according to the virtual machine identifier, the virtual machine environment for processing the application code.

16. The hard disk of claim 12, further comprising a memory, wherein the processor is further configured to:
  create an application code process for the application code in the virtual environment;
  load the application code into the memory, wherein the memory corresponds to the application code process; and
  execute the application code process in the virtual environment.

17. The hard disk of claim 12, wherein the processor is further configured to process the data according to an execution policy of the application code comprising at least one of a trigger condition for executing the application code, an execution condition of the application code, or an operation to be executed after execution of the application code is completed.

18. The hard disk of claim 12, wherein the processor is further configured to execute the application code to execute virus scanning, integrity checking, compressing, and garbage collecting for the data.

19. A hard disk comprising:
a data interface configured to receive an application code from a server;
a storage for storing the application code;
a hard disk medium configured to store data; and
a processor coupled to the storage and configured to:
   create an application code process for the application code, wherein the application code process is a dynamic execution of a program and is a unit of allocating and scheduling resources by an operating system;
   load the application code into a random-access memory (RAM); and
   execute the application code process to process the data in the hard disk medium.

20. The hard disk of claim 19, wherein the processor is further configured to process the data according to an execution policy of the application code, and wherein the execution policy comprises:
   at least one of a trigger condition for executing the application code, an execution condition of the application code, or an operation to be completed after execution of the application code is completed;
   an identifier of the application code;
   a start position of the application code; or
   a length of the application code.

21. The hard disk of claim 19, wherein the application code is in a binary format.

22. The hard disk of claim 19, wherein the processor is further configured to execute the application code to execute virus scanning, integrity checking, compressing, and garbage collecting for the data.

* * * * *